United States Patent
Schuster et al.

(10) Patent No.: US 6,351,524 B1
(45) Date of Patent: Feb. 26, 2002

(54) TOLL SAVING METHOD AND APPARATUS FOR A REMOTE ACCESS SYSTEM

(75) Inventors: Guido M. Schuster, Des Plaines; Ikhlaq S. Sidhu, Vernon Hills; Jacek A. Grabiec, Chicago; Michael S. Borella, Naperville, all of IL (US)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/234,187

(22) Filed: Jan. 20, 1999

(51) Int. Cl.7 .................. H04M 1/64; H04M 3/537; H04M 11/00; H04M 15/06
(52) U.S. Cl. .................. 379/88.23; 379/93.24; 379/142.06
(58) Field of Search .................. 379/93, 188, 98, 379/88.01, 88.19, 88.2, 88.22, 88.23, 88.24, 88.25, 93.24, 127, 142, 196, 197, 198, 199, 200, 127.01, 142.06; 348/13; 375/5

(56) References Cited

U.S. PATENT DOCUMENTS

| | | | |
|---|---|---|---|
| 4,266,098 A | * 5/1981 | Novak ................ 379/199 X |
| 4,277,649 A | 7/1981 | Sheinbein |
| 4,924,496 A | * 5/1990 | Figa et al. ............. 379/199 X |
| 4,937,854 A | * 6/1990 | Sarakas ................ 379/199 |
| 5,138,653 A | 8/1992 | LeClercq |
| 5,195,130 A | * 3/1993 | Weiss et al. ............ 379/98 |
| 5,377,260 A | 12/1994 | Long |
| 5,388,150 A | 2/1995 | Schneyer et al. |
| 5,546,448 A | 8/1996 | Caswell et al. |
| 5,577,105 A | * 11/1996 | Baum et al. ............ 379/93 |
| 5,635,980 A | * 6/1997 | Lin et al. .............. 348/13 |
| 5,659,570 A | * 8/1997 | Cotreau et al. .......... 375/5 |
| 5,742,667 A | 4/1998 | Smith |
| 5,802,166 A | 9/1998 | Garcia et al. |
| 5,841,850 A | 11/1998 | Fan |
| 5,844,975 A | 12/1998 | Sugawara et al. |
| 5,850,519 A | 12/1998 | Vazana |
| 5,930,338 A | * 7/1999 | McKendry et al. ...... 379/88.25 |
| 5,944,786 A | * 8/1999 | Quinn ................. 379/93.24 |
| 6,212,265 B1 | * 4/2001 | Duphorne ............. 379/142 |

OTHER PUBLICATIONS

U.S. application No. 08/979,758, Cason, filed Nov. 26, 1997.

* cited by examiner

*Primary Examiner*—Harry S. Hong
(74) *Attorney, Agent, or Firm*—McDonell Boehnen Hulbert & Berghoff

(57) ABSTRACT

A toll saving method and apparatus for a remote access system is provided. A first communication device receives a connection request from a second communication device. The first communication device then decodes caller identification information from the connection request to determine a user identity, without completing the connection request. The first communication device determines whether an event associated with the user identity has occurred. If the event associated with the user identity has not occurred, the connection request is not completed. In a preferred embodiment, the toll saving method and apparatus allows an email user to call an ISP to determine whether unaccessed email is present in the user's account. If no email is present in the user's account, the call is never answered and no toll charges are incurred.

41 Claims, 10 Drawing Sheets

FIG. 5

USER PROFILE DATABASE 330

| USER NAME | USER ID | ORIGIN1 | DEVICE1 | ORIGIN2 | DEVICE2 | SPECIFIED CONDITION | STATUS CODE |
|---|---|---|---|---|---|---|---|
| GUIDO SCHUSTER | schuster | 123.456.7890 | PC | 234.567.8901 | PC | N | N |
| IKHLAQ SIDHU | sidhu | 345.678.9012 | PC | 456.789.0123 | T | N | W |
| JACEK GRABIEC | grabiec | 678.901.2345 | PC | | | U | U |
| MICHAEL BORELLA | borella | 789.012.3456 | | 890.123.4567 | T | W | N |

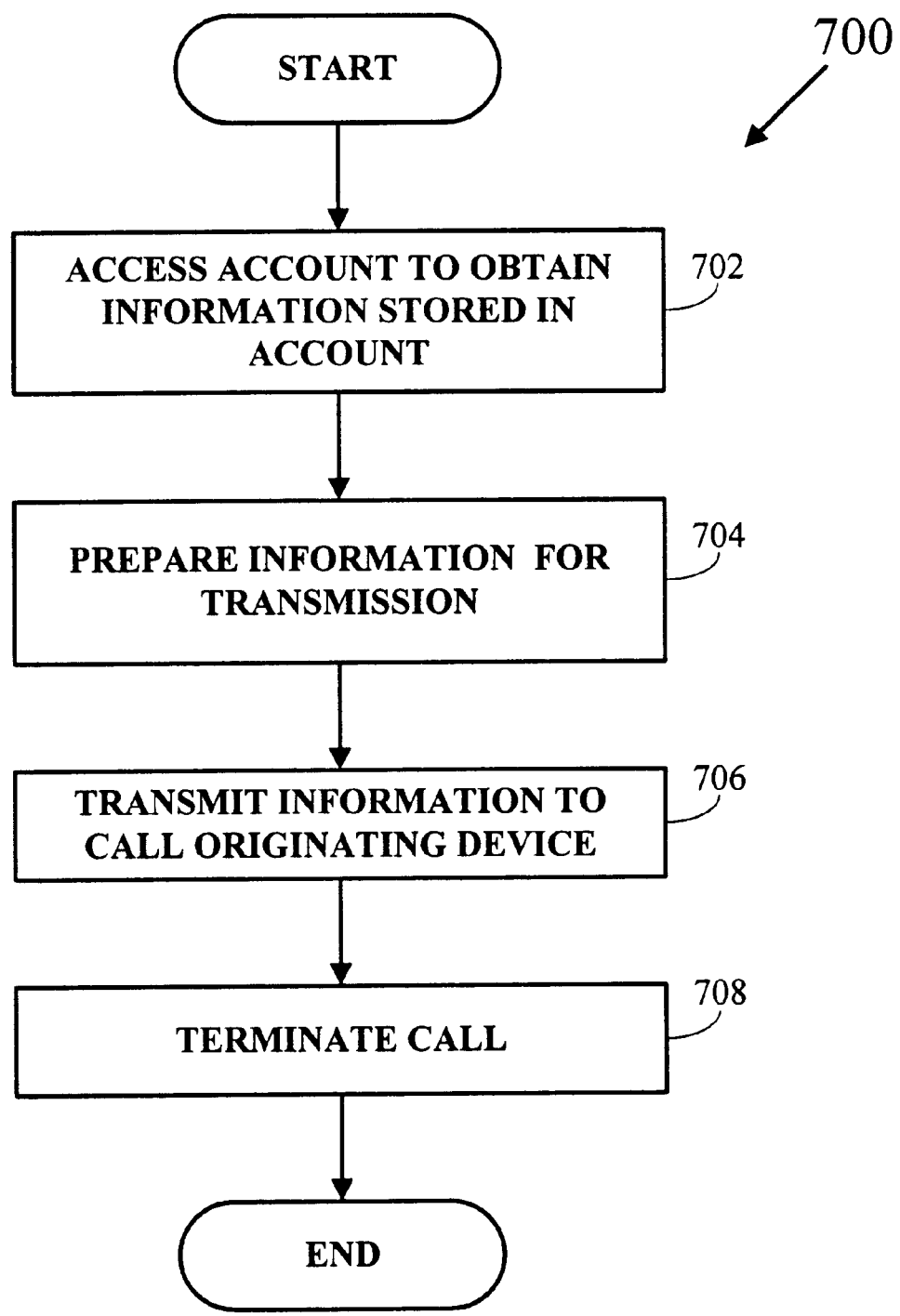

TOLL SAVING METHOD AND APPARATUS FOR A REMOTE ACCESS SYSTEM

FIELD OF INVENTION

This invention relates to the field of data communication, and more particularly, to a toll saving method and apparatus for a remote access system.

BACKGROUND OF THE INVENTION

Dial-up users make up a large percentage of wide area network users, particularly Internet users. For many Internet users, it is not practical to pay for a dedicated connection to the Internet. This is especially true in a non-business setting. Many households having personal computers would be required to add a second line so that voice calls could be received or initiated while a household computer is on-line. Many internet service providers (ISPs) also charge more for dedicated connections because a dedicated connection is theoretically always in use, while a dial-up connection is only in use when the user desires access to the network served by the connection. For this same reason, ISPs often charge fees if a dial-up user stays connected for longer than an allocated time limit. Usually the time limit is a cumulative time limit for a specified time period. For example, a typical agreement may allow a user to be connected for no more than thirty hours per month. If the user goes over that time limit, then a penalty may be imposed by the ISP, such as an increased fee, for example. Therefore, there is an incentive for users to use connection time efficiently.

Many Internet users have no need for a dedicated connection. The World Wide Web (the "Web") has a variety of useful information, but much of it does not require a dedicated connection to be useful to the user. Many Internet users simply use software to call their ISP to form a dial-up connection, using Serial Line Internet Protocol (SLIP) or Point-to-Point Protocol (PPP), for example, across a telephone line. The user can then use a web browser to quickly retrieve information. When the user is done retrieving information, the dial-up connection can be terminated, and the telephone line is free again.

Similarly, many users do not need to retrieve email immediately after it is sent to their email address and received by the ISP. Under a dedicated connection scheme, prompt retrieval is expected. But for many settings, particularly non-business settings, there is often no real urgency to many of the email messages, and the main advantages of using email as a communication tool is in the ease of use and the savings in postage or telephone charges that email affords to the user.

However, it can be frustrating for a user to go through the steps of running communication software, dialing up the ISP to form a dial-up connection, and running email software to check for email on the ISP's server only to find that there is no email waiting on the server. A user's time is needlessly consumed by having to perform the process repeatedly.

It may be possible to configure a communication software program to automatically connect to a communication device operated by an ISP to check for email, news, or other similar information. Such a program may also be configurable to download the information itself. By having a modem automatically poll the ISP, the user is saved from some of the time and tediousness of manually logging in.

However, it can also be costly to frequently connect to the ISP to check for email. Many telephone companies charge consumers on a per call basis. Under such an arrangement, with each call that the modem makes to the ISP, there is a charge to the user's telephone service account. When modem calls are made merely to check for email that may not even exist, the user pays needlessly. Similarly, if the call is a long distance call, as may be the case in rural areas, additional toll charges may be incurred.

One possible solution is for the ISP to call the user whenever there is new email or other updateable information in the user's account. A similar system is described in U.S. Pat. No. 5,802,166 issued Sep. 1, 1998 to Garcia et al. Garcia describes a device that receives predetermined asynchronous Frequency Shift Keying (FSK) signals and/or audible tones transmitted by a telephone provider's off premise central switching office. These signals indicate different types of electronically stored communication messages awaiting retrieval, such as voice mail, email, fax mail, and video mail. Responsive to receiving the FSK signals and/or audible tones via the telephone line, the user's device provides a visual notification of the stored messages. However, the device described by Garcia et al. does not teach how to allow the user to specify when such notifications will occur, nor does it teach how to cause the information itself to be downloaded. While Garcia's device may be an improvement upon broken tone voicemail notification systems for telephone providers, it does not allow a user to configure a device to periodically check for email or other similar information while reducing costs associated with long distance and per call tolls.

Thus, there is currently a need for a method or apparatus that would allow a communication device to notify account holders about the status of email or other similar information contained within the account holder's account without incurring any costs related to the communication device having to make outgoing calls.

There is also a need for a method or device that would allow a communication device to notify account holders about the status of email and/or other updateable information corresponding to the account holders' accounts where the notification schedules are specified by the individual account holders.

There is also a need for a method or device that would allow a communication device to check the status of email or other similar information stored in an account holder's account, and which is capable of retrieving the information from the account holder's account and sending the information to the account holder.

There is also a need for a method or device that would allow a communication device to notify account holders about the status of email and other similar information on the account holders' accounts, and which is capable of taking advantage of the existing telephone infrastructure.

SUMMARY OF THE INVENTION

In view of the above, a toll saving method for determining an event status is provided. A first communication device receives a connection request from a second communication device. The first communication device then decodes identification information from the connection request to determine a user identity, without completing the connection request. Next, the first communication device determines whether an event associated with the user identity has occurred. If the event associated with the user identity has occurred, the connection request is completed.

In a further aspect of the invention, if the event associated with the user identity has occurred, then the first communication device sends a notification signal to the second communication device.

In yet another aspect of the invention, if the event associated with the user identity has occurred, then information corresponding to the event is transmitted to the second communication device.

The present invention is further directed to an apparatus for providing access to a remote access system. The apparatus includes a first decoder for decoding caller identification signals while the apparatus is in an on-hook state, to identify a user account corresponding to the incoming call. A second decoder determines event status corresponding to the user account, and a controller switches the apparatus to an off-hook state in response to a determination of a specified event status.

In a further aspect of the present invention, a transmitter is provided for transmitting the information to a telephony device.

The foregoing and other features and advantages of preferred embodiments of the present invention will be more readily apparent from the following detailed description, which proceeds with references to the accompanying drawings.

BRIEF DESCRIPTION OF THE DRAWINGS

These and other objects, advantages, and features of the invention will appear for purpose of illustration, but not of limitation, in connection with FIGS. 1–10, wherein like numbers refer to like parts throughout and in which:

FIG. 5 is a representation of a preferred embodiment of a user profile database according to the present invention;

FIG. 10 is a flow diagram illustrating an implementation of a fourth set of machine language instructions according to the preferred embodiment.

DETAILED DESCRIPTION OF THE PRESENTLY PREFERRED EMBODIMENTS

Figure 1:
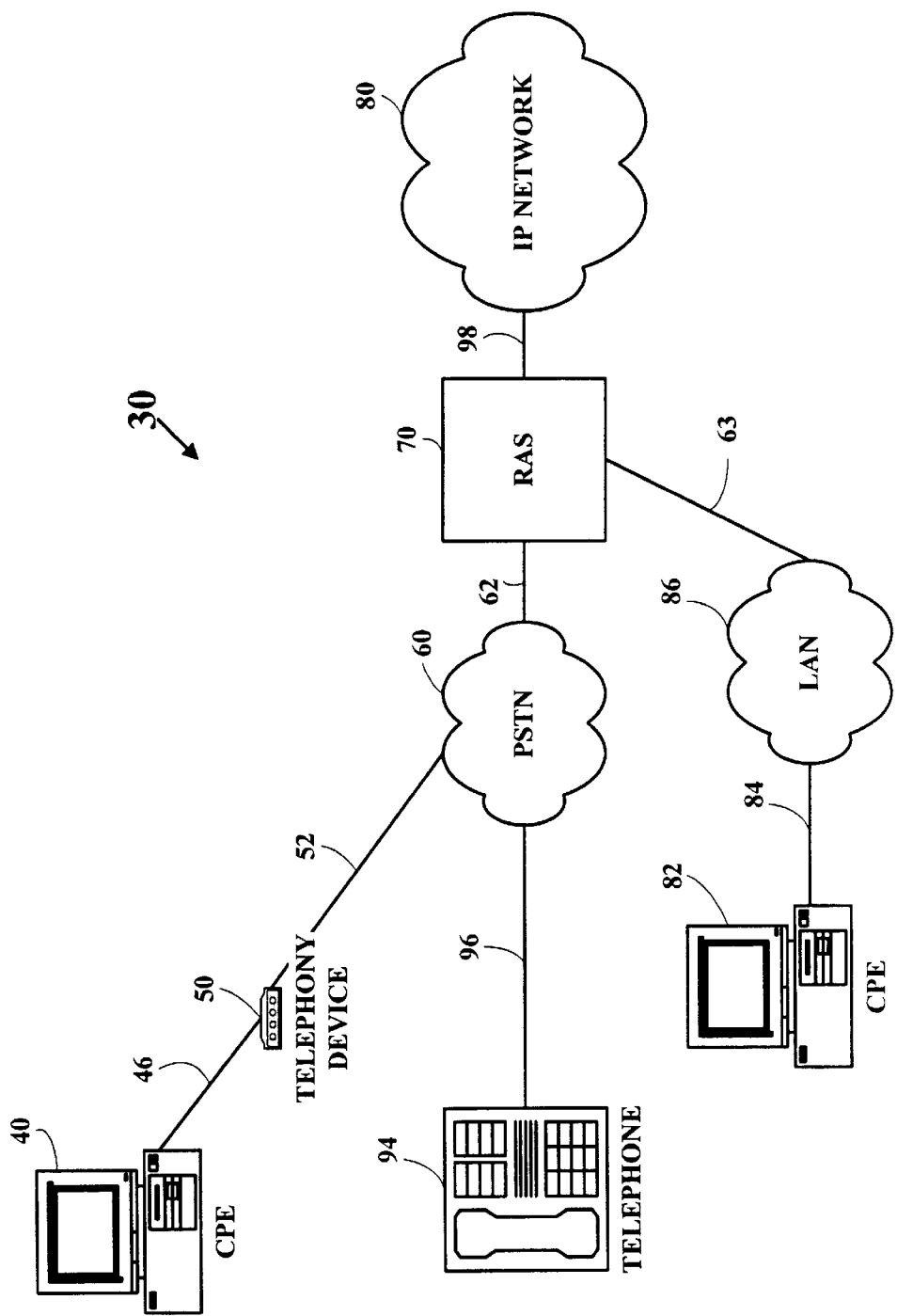
FIG. 1 is a block diagram illustrating an exemplary dial-up remote access system.

FIG. 1 is a high level diagram showing three different types of connections in a remote access system 30 of a type in which the present invention finds particular use. Remote access system 30 includes user customer premises equipment (CPE) 40 and telephony device 50 connected via a communication line 52 over a Public Switched Telephone Network (PSTN) 60 via a second communication line 62 to a Remote Access Server (RAS) 70. RAS 70 may be connected by connection 98 to internet protocol (IP) network 80. Communication lines 52 and 62 may be analog lines, or they may be digital lines (such as T-carrier lines), or they may be a combination of analog and digital lines. Communication lines 52 and 62 need not be physical wires, and may instead be composed partially or entirely of wireless transmission technology, such as radio frequency (RF). An example of one embodiment of communication lines 52 and 62 is a cellular telephone link.

Also shown in FIG. 1 is a second CPE 82 preferably connected through a networking card and cable 84 to a local area network (LAN) 86. The LAN 86 is connected through communication line 63 to RAS 70, so that CPE 82 may access IP network 80. Communication line 63 is preferably a leased line, such as a leased T1 line. Other communication line implementations are possible as well. LANs are known by those having skill in the art, as is the technology and methodology for accessing an IP network through an RAS from a LAN-based CPE.

Telephone 94 may be used to form a connection across communication line 96 through PSTN 60 across communication line 62 to RAS 70. Such a telephone-based system may be used for IP telephony using Voice over IP (VoIP), for example, in which voice signals are digitized and then packetized according to the Internet Protocol (IP), for transport across multiple networks to a destination. Similarly, the system could be used to communicate information using Dual Tone Multi Frequency (DTMF) signaling, or voice signaling, for example.

CPEs 40 and 82 may each consist of a general purpose computing platform (such as an IBM PC compatible computer) running an operating system, such as Windows 95™, Windows 98™, or Windows NT™, all from Microsoft Corporation, or UNIX. Other commercially available operating systems may alternatively be used. CPEs 40 and 82 may be at the home or office of a user, or they may be at some other location.

Telephony device 50 is preferably a modem device, such the U.S. ROBOTICS™ 56K FAXMODEM, manufactured by 3Com Corporation. At the user's side, modems are typically used to send digital data signals over an analog PSTN connection. A modem converts digital data signals into variations of an analog sine wave so that data can be transmitted over the PSTN. A second modem reverses the process in order to provide a digital bit stream to a remote device, such as a computer. Modems are standardized by the International Telecommunication Union, Telecommunication Standardization Section (ITU-T) as part of the well known "V" series of standards, including, for example, Recommendation V.90 and Recommendation V.34. The ITU-T Recommendations V.90 and V.34 are incorporated by reference herein.

Other telephony devices besides analog modems may also be used to practice the present invention. For example, Asymmetric Digital Subscriber Line (ADSL) modems and cable modems, both bidirectional and unidirectional having a telco return, may also be used. It should be noted that although the word "modem" is used, which has its origins in the analog oriented phrase "MOdulator-DEModulator," no limitations are implied. Both analog and digital systems are supported, and "modem" is not necessarily used here to describe the technology of telephony device 50.

Telephony device 50 may be external to user CPE 40, as shown in FIG. 1, or it may be internal. Internal telephony devices are well known.

The connections illustrated in FIG. 1 between the PSTN 60 and CPE 40, and between the PSTN 60 and telephone 94, are provided as examples of typical connections. Those skilled in the art of data communication will appreciate that the examples are not limiting, in number or kind, the user connections to which the preferred embodiments are applicable.

RAS 70 may consist of a modem, a modem pool, or a remote access server, for example. A remote access server (RAS), which may also be referred to as a network access server, is commonly used by Internet Service Providers (ISPs) to serve analog modem users. However, the RAS architecture can also be applied to ISDN, ADSL, Frame Relay, X.25 and T-carrier users. Devices having these capabilities are currently available from several companies, including 3Com Corporation, Ascend Communications, Livingston Enterprises, Multitech, and others. A preferred device is the Total Control™ Enterprise Network Hub, available from 3Com Corporation. An example of a remote access server similar to The Total Control™ Enterprise Network Hub is described in the patent to Dale E. Walsh et al., U.S. Pat. No. 5,528,595, which is incorporated by reference herein.

Figure 2:
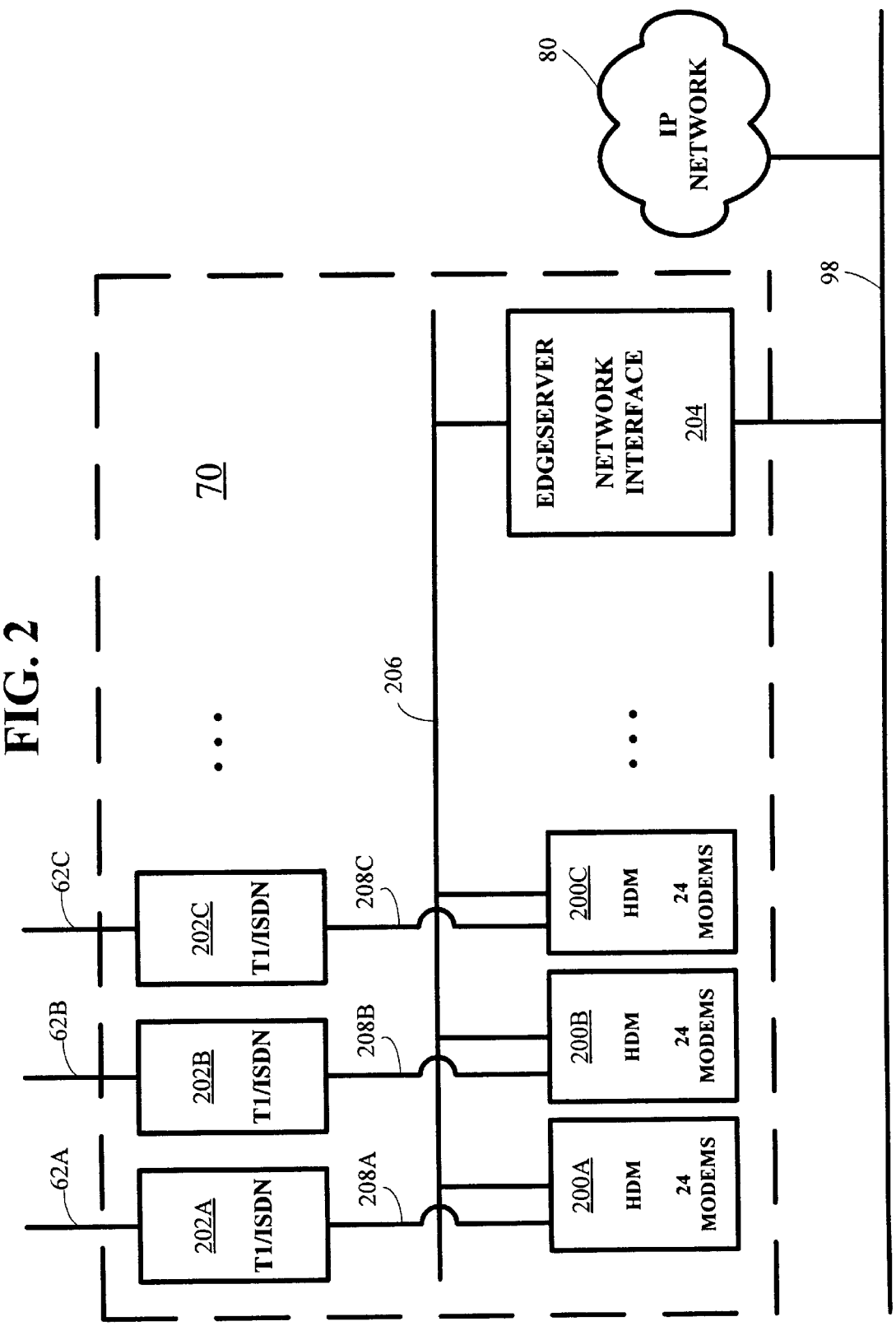
FIG. 2 is a block diagram illustrating a remote access server in an exemplary IP remote access system.

The architecture of an RAS configured as the RAS 70 in a preferred embodiment is shown in FIG. 2. The preferred embodiment uses T1 lines, but those skilled in the art of data communication will appreciate that the example is not limiting, in number or kind, the connections to which the preferred embodiments are applicable. RAS 70 includes a plurality of high-density modems 200A–C each having a T1/ISDN telephone line interface 202A–C. The high-density modems 200A–C communicate with a network interface 204 over a packet system bus (S-bus) 206. The high-density modems 200A–C, the T1/ISDN telephone line interfaces 202A–C, and the network interface 204 are preferably on individual printed circuit boards or cards arranged in a chassis. The high-density modems 200A–C are "high density" in that each high-density modem 200A–C contains a high-density digital signal processing (DSP) configuration capable of handling 23, 24 or 30 DSO channels.

By providing a set of high density modems 200 and a robust computing platform in the network interface 204, a single chassis can process many hundreds of calls through RAS 70 simultaneously. The term "HDM" for the modem cards 200A–C in FIG. 2 is an acronym for "high density modem," indicating that each card performs modem functions for a number of channels on the telephone line. For example, each high-density modem 200A–C may perform modem functions for 23 B channels plus 1 D channel for an ISDN Primary Rate Interface, 24 DSO channels for a T1 line and 30 channels for an E1 line.

In the embodiment of FIG. 2, each high-density modem 200A–C has its own T1/ISDN telephone line interface 202A–C connected to an ISDN PRI or T1 line at connections 62A–C, respectively. Connections 62A–C may serve as connections 62 and 63 in FIG. 1, for example. The T1/ISDN telephone line interfaces 202 are connected to the high-density modem cards by a Time Division Multiplex (TDM) bus 208A–C. The TDM bus 208 and the T1/ISDN telephone line interface 202 of FIG. 2 are described in further detail in U.S. Pat. No. 5,528,595.

The T1/ISDN telephone line interface 202 card is composed of two separate modules, an incoming call interface module and an incoming call application module. The interface module physically receives the incoming T1 span lines at connections 62A–C, converts the signals into a digital TTL format, and delivers the signals to the incoming call application module. The interface module recovers clock signals and data from the incoming T1 signals, and also transmits outgoing digital telephone signals representing digital data to the T1 lines at connections 62A–C. The application module provides framing of recovered T1 data to extract the T1 DSO channel data and then switches the channel data every twenty four time slots on the TDM bus 208 to the corresponding high-density modem 200.

An alternative for connecting the T1/ISDN telephone line interface cards 202A–C to the high-density modems 200A–C would be to provide a plurality of T1/ISDN telephone line interface cards 202 and distribute channel data to the modems via a TDM bus with extra highway lines, as described in Schoo et al., U.S. patent application Ser. No. 08/970,834, "DISTRIBUTED PROCESSING OF HIGH LEVEL PROTOCOLS, SUCH AS REAL TIME TRANSPORT PROTOCOLS, IN A NETWORK ACCESS SERVER," which is hereby incorporated by reference.

The network interface 204 consists of a general purpose computing platform (such as an IBM PC) running an operating system such as Windows 95™, Windows 98™, or Windows NT ™ from Microsoft Corporation, or UNIX. The network interface card 204 contains software and hardware modules to perform call routing, modem configuration and other features as set forth and described for the gateway modules in U.S. Pat. No. 5,525,595 and U.S. Pat. No. 5,577,105, "TELEPHONE CALL ROUTING AND SWITCHING TECHNIQUES FOR DATA COMMUNICATIONS," issued to Baum et al., also incorporated by reference herein. Such a network interface card is available from 3Com Corporation under the trade name EDGESERVER™, which is further described in U.S. patent application Ser. No. 08/813,173, "COMMUNICATION ACCESS CHASSIS WITH GENERAL PURPOSE COMPUTING PLATFORM," issued to William Verthein et al., incorporated by reference herein.

The RAS 70 is able to perform administrative tasks such as user authentication, accounting, and logging. Alternatively, user authentication may occur within a RADIUS or DIAMETER server.

For the RADIUS alternative, each dial-up user has a profile on the RADIUS server. The profile contains information such as user ID/password pairs, default serial line protocols and MTUs (maximum transfer units). RADIUS is extensible; thus, it can be programmed to support virtually any user information. In a typical dial-up session with RADIUS authentication, the client dials into the ISP and initiates a (Point-to-Point Protocol) PPP connection with the RAS. During the PPP setup and negotiation, the client transmits a user ID and password in response to the RAS login request. The RAS passes this information to the RADIUS server, which authenticates the user in a local user database. At this time, the RADIUS server may pass administrative information back to the client and/or the RAS. The RADIUS server is also notified by the RAS when the user's connection is dropped. RADIUS servers log and timestamp all such activity. For more information on RADIUS, see Request For Comment RFC-2138, "Remote Authentication Dial In User Service (RADIUS)," published by the Internet Society in April 1997.

It will be understood by one of ordinary skill in the art that, although the description above is directed at using the Internet as the data network in the preferred embodiments, other data networks may be used as well. For data networks other than the Internet, one of ordinary skill in the art would know how to make the appropriate modifications to the example embodiments described below. Similarly, although the examples are described with reference to an Internet Service Provider (ISP), the concepts of the present invention apply to any entity that receives incoming calls and provides access to accounts having the capability to store email or other similar information.

Referring again to FIG. 1, user CPE 40 operates in cooperation with telephony device 50. In the preferred embodiment, communication software located on user CPE 40 may be configured to cause telephony device 50 to place a call at periodic intervals to a phone number corresponding to RAS 70. A call schedule may be used to specify when the calls are automatically originated by CPE 40 and telephony device 50.

Figure 3:
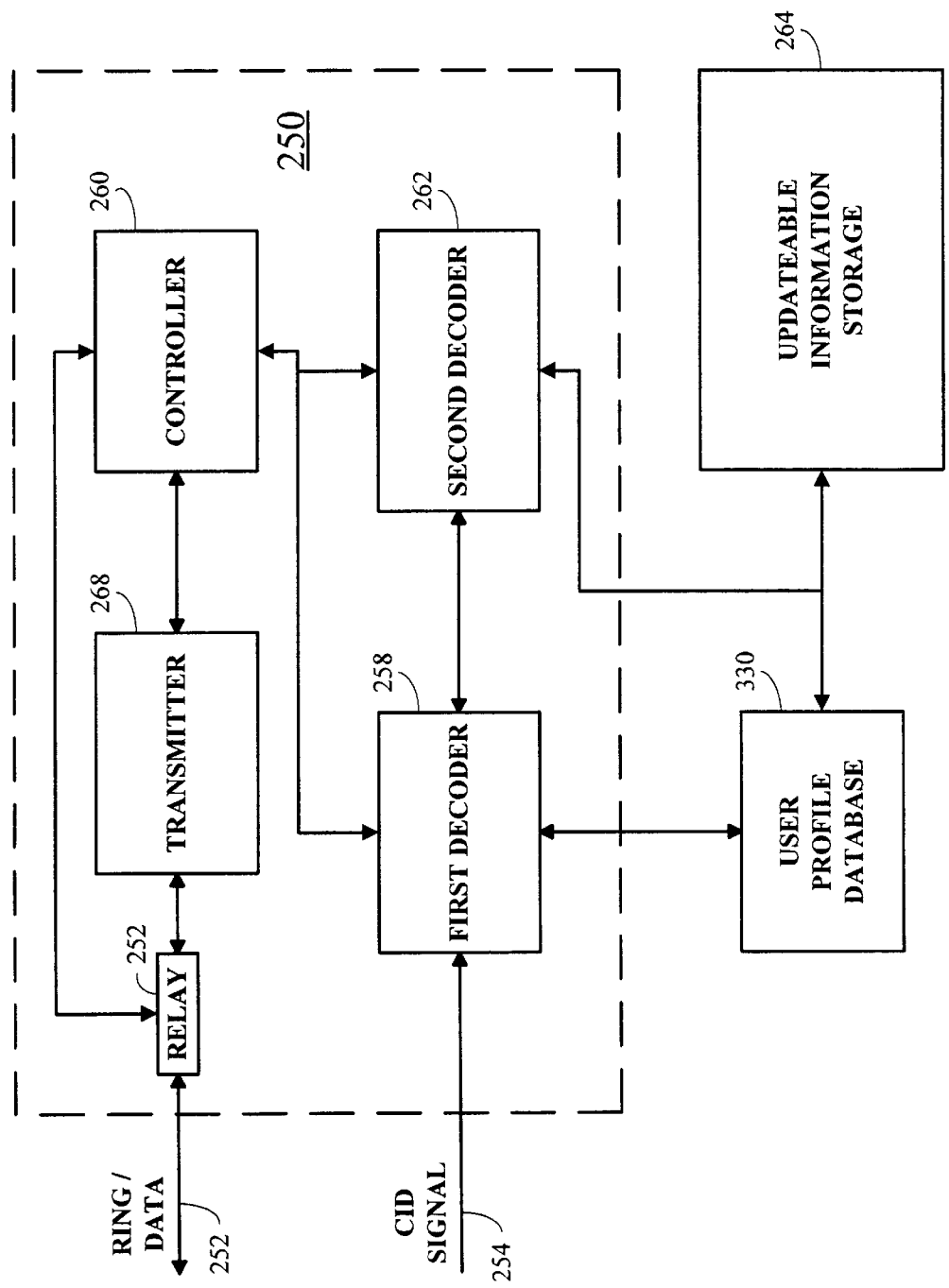
FIG. 3 is a block diagram of an exemplary toll saving apparatus in a remote access system.

FIG. 3 is a block diagram of an exemplary toll saving apparatus 250 in a remote access system. An incoming connection request is received on ring/data line 252. A caller identification (CID) signal is received on CID signal line 254. The CID signals are associated with the connection request. The CID signals identify a communication device that originated the connection request, and may include information such as a telephone number, name, or address, for example. Toll saving apparatus 250 does not initially complete the connection request received on ring/data line 252. Relay 256 is therefore open, maintaining the toll saving apparatus 250 in an on-hook state. While toll saving apparatus 250 is in an on-hook state, a first decoder 258 decodes the CID signals using known techniques. The first decoder 258 then accesses user profile database (UPD) 330 to determine if the originating communication device is recognized as being associated with a user account serviced by the remote access system. If the first decoder 258 determines that a user account is associated with the originating communication device, then the account is identified for reference by other components within toll saving apparatus 250. If the first decoder 258 determines that no user account is associated with the originating communication device, then first decoder 258 sends a NO_ACCT signal to controller 260. Controller 260 will then either cause the connection request to go uncompleted or perform a quick hang up operation. Controller 260 can cause the connection request to go uncompleted by maintaining relay 256 in an open position, thereby leaving toll saving apparatus 250 in an on-hook state. Controller 260 can perform a quick hang up operation by momentarily closing and then opening relay 256.

A second decoder 262 determines whether an event has occurred in the user account identified by first decoder 258. An example of an event is a presence of unaccessed email. Other examples include a presence of accessed but unread email, a presence of accessed email, a presence of unaccessed voicemail, an occurrence of a financial condition, an occurrence of a weather condition, an occurrence of a sports score condition, or an occurrence of a traffic condition. Information is associated with each of these events, such as email messages in the case of an unaccessed email event, or a stock price message in the case of a financial condition event. The second decoder 262 determines whether an event has occurred by accessing the account identified by first decoder 258 and located in updateable information storage 264. The second decoder 262 then examines the account located in updateable information storage 264 to determine event status. A second way in which the second decoder 262 determines whether an event has occurred is by accessing user profile database (UPD) 330, and querying a status code field in UPD 330. The status code field indicates an event status, and is updated when the user accesses the account or when an event has occurred. The status code field is discussed in more detail with reference to FIG. 5.

The event status determined by second decoder 262 is used by controller 260 to control relay 256 and a transmitter 268. If the event status equals a specified event status, then the controller closes the relay 256, placing toll saving apparatus in an off-hook state. Transmitter 268 can then transmit a notification signal to the originating device, indicative of the event status determined by the second decoder 262. Alternatively, transmitter 268 can transmit the account information associated with the event, such as email messages, to the originating device.

Figure 4:
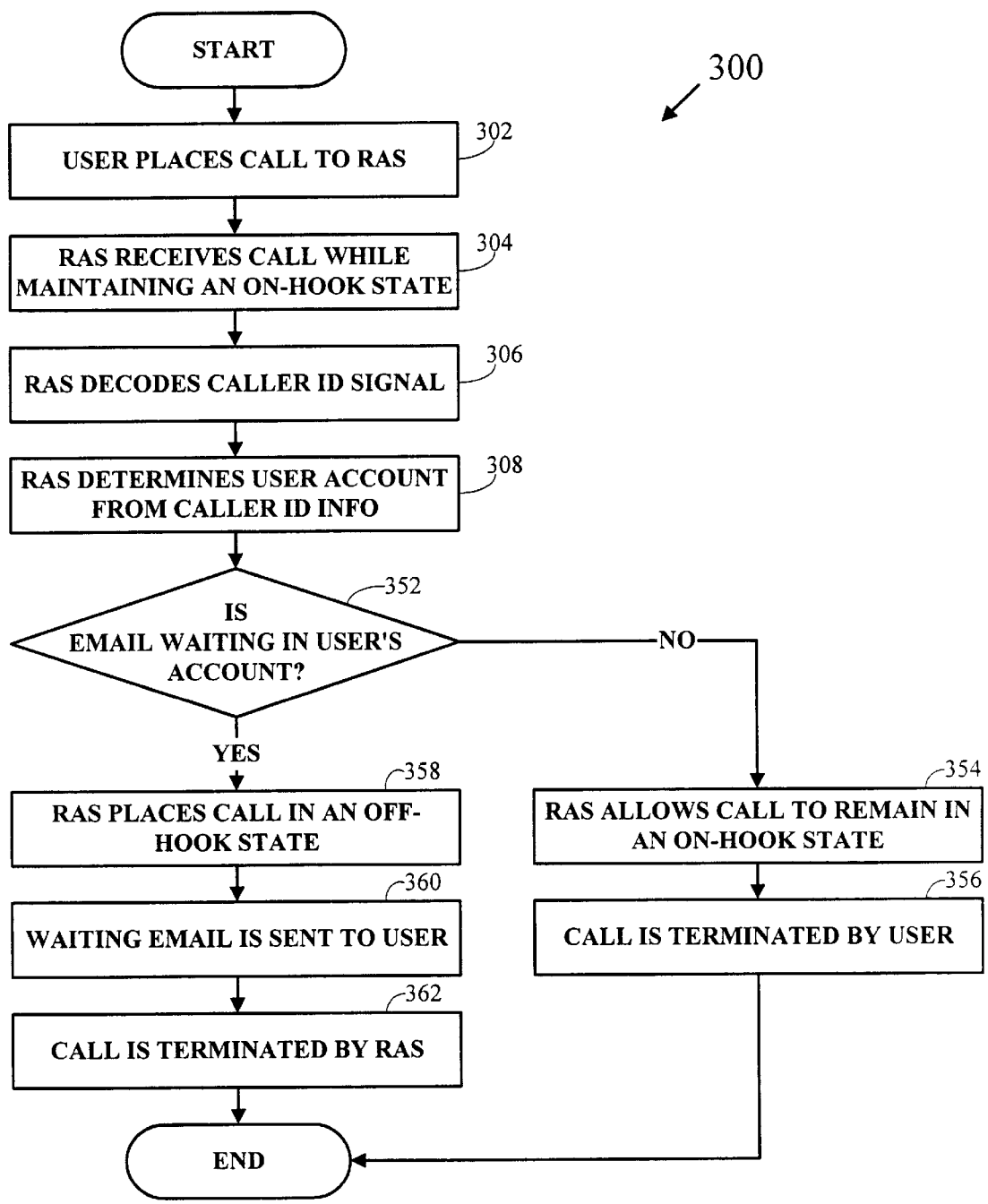
FIG. 4 is a flow diagram illustrating a first implementation of a toll saving method.
Figure 6:
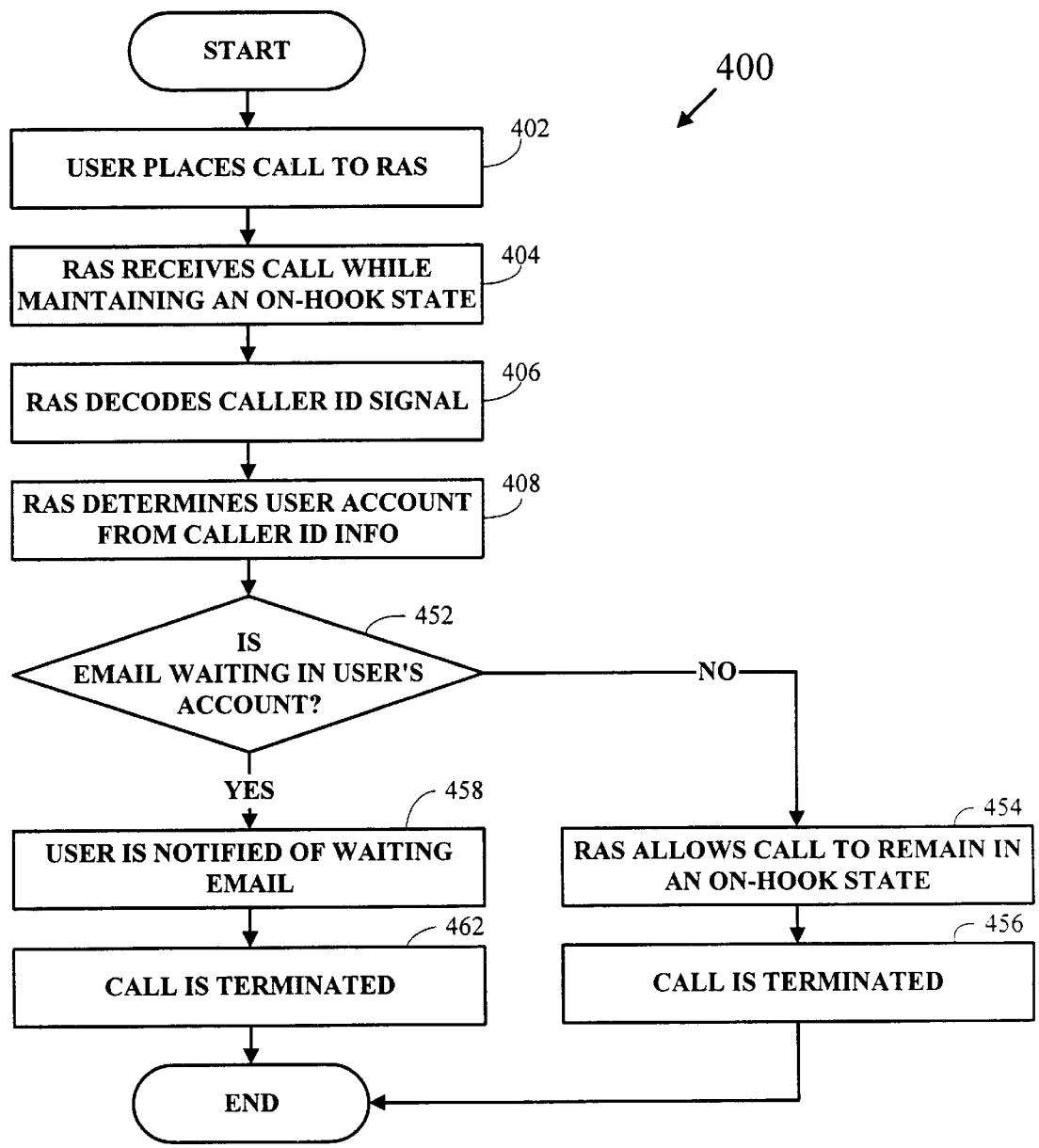
FIG. 6 is a flow diagram illustrating a second implementation of a toll saving method.

Other embodiments besides those discussed above are possible. FIGS. 4 and 6 describe preferred embodiments of a toll saving method for a remote access system, using email and a remote access server (RAS) as examples.

FIG. 4 is a flow diagram illustrating a first implementation of a toll saving method 300 according to the present invention. First, the user places a call to the RAS, as is shown in step 302. The user may place the call using one of several different techniques. The user may initiate a standard voice call using a telephone to the phone number of the RAS, for example. Another technique is for the user to run communication software on a computer to cause a telephony device, such as a modem, to place a call to the phone number of the RAS. Another technique is for a computer to automatically place a call to the phone number of the RAS, where the computer is controlled by software that has been configured with a polling schedule to call the RAS when predetermined criteria, such as a specified time of day, have been met. Identification information corresponding to the origin of the call is located in a user profile database (UPD) that is accessible by the RAS.

After the user has initiated a call to the RAS, the RAS receives the call while maintaining an on-hook state, as shown by step 304. This can be accomplished by using a ring detect circuit. Such ring detect circuits are present in telephones, modems, and other telephony devices, and are well known by those skilled in the art. An on-hook state is maintained by not switching to an off-hook state. In effect, the ringing continues until the caller hangs up, or until the RAS answers the call by switching to an off-hook state.

After the RAS receives the call while maintaining an on-hook state, caller identification (CID) signals are decoded by the RAS, as shown by step 306. Several standards for CID signals exist, and decoding is accomplished differently under each standard. Under most standard telephone CID systems, CID signals are transmitted during the long silent interval of the first ringing cycle (between the first and second rings). CID signals are typically transmitted by a Stored Program Control Switching system (SPSC), however, the preferred embodiment may be modified to decode any type of CID signals that are transmitted across a communication line while the RAS is in an on-hook state, or before the call is answered by the receiving RAS. Bellcore's CID system is described in Bellcore TR-NWT-000031, "CLASSSM Feature: Calling Number Delivery," and TR-NWT-001188, "CLASSSM Feature: Calling Name Delivery Generic Requirements."

Common Channel Signaling System Number-7 ("CCS7" or "SS7") is another means for CID implementation. SS7 is a method of signaling for ISDN systems that uses out-of-band or separate channel signaling for conveying signaling information for a number of telecommunication channels. Common channel signaling is used in the Public Switched Telephone Network ("PSTN"), with Integrated Services Digital Network ("ISDN"), circuit switched networks, and data networks. Common channel signaling is also being used for cellular and mobile telephony and network management. The common channel carrying signaling information is called a signaling link. Signaling information is exchanged between signaling points over a signaling link using signaling data packets.

The CID decoding step may be performed by hardware and/or software in the RAS, or it may be performed by hardware and/or software in communication with the RAS. CID decoders are known by those having skill in the art.

After CID signals are decoded by the RAS, the RAS uses the decoded information to determine which user account is being queried, as is shown by step 308. This may be accomplished using one or more of several different techniques. The techniques may differ depending on the content of information coded in the CID signals and the hardware employed at the RAS end of the system, for example. The techniques preferably use a user profile database (UPD).

FIG. 5 sets forth an example of a UPD serving a group of users consisting of Guido Schuster (332), Ikhlaq Sidhu (334), Jacek Grabiec (336), and Michael Borella (338). The heading ORIGIN1 340 indicates a first telephone number associated with the user. The heading DEVICE1 342 indicates the type of device that is configured to place calls from the first telephone number. This is an optional field, and may not be needed, depending on the type of notification signal or information download to be provided. The heading USER ID 344 identifies the account associated with the user. An account may also be identified by other information, such as the user name or a prespecified origin phone number, for example. The heading ORIGIN2 346 indicates a second telephone number associated with the user. The heading DEVICE2 348 indicates the type of device that is configured to place calls from the second telephone number. Similarly, other origin and device fields may be added to accommodate larger numbers of origins. The heading SPECIFIED CONDITION 349 indicates a user specified status condition that determines when a positive notification signal should be provided to a user or user device calling to check email status. For example, a specified condition "U" may indicate the user wants to be notified of a presence of new mail in the user's account. A specified condition of "TU" may indicate the user wants new mail to be transmitted to the user's telephony device. Many other alternative specified conditions are possible. The heading STATUS CODE 350 indicates the current status of email or other updateable information corresponding to the user's account. User profile database 330 may contain other fields besides those listed above. User profile database may also consist of a portion of an existing database, or a modification of an existing database.

One way of implementing the user profile database 330 is to maintain the table as a data structure in a stand-alone computer comprising an ISP's gateway/terminal. Alternatively, it could be incorporated into the functionality of an RAS maintained by the ISP (e.g., such as a feature implemented by an Edgeserver Card of the Total Control Enterprise Network Hub from 3Com Corporation, or a similar type of remote access server). The user profile database 330 could also be incorporated into an accounting, authentication, and authorization (AAA) server, such as a RADIUS server. Any other convenient manner could also be used to implement user profile database. For the present example, the user profile database is maintained in a memory structure (e.g., RAM) in the ISP gateway/terminal.

The actual entries in the user profile database may be obtained dynamically from queries to the AAA server described above.

Returning to step 308 of FIG. 4, the user profile database described above may be used to determine which user account is being queried. If the phone number of the calling party is decoded from the CID signals, user profile database 330 is accessed to determine the USER ID 344 corresponding to the decoded phone number. For example, in FIG. 5, if the incoming phone number was 123.456.7890, the USER ID is determined to be schuster. An incoming phone number of 890.123.4567 is determined to correspond to USER ID borella. If the name of the calling party is decoded from the CID signals, user profile database 330 is accessed to determine the USER ID 344 corresponding to the decoded user name. Other decoded CID information may be used to determine the USER ID of the calling party as well.

After the RAS uses the decoded information to determine which user account is being queried, it is then determined whether email or other similar information is present in the user's account, as shown by step 352. Although the present example is described with reference to email, the preferred embodiment is equally applicable to other types of similar information. For example, weather reports, stock alerts or quotes, horoscope updates, sport score updates, voice mail, pager messages, news alerts, video mail, and other types of information having a status associated with them fall within the realm of the present invention.

To determine whether email is present in the user's account at step 352, several techniques may be used. One technique involves simply accessing the user's account to check for an unread email flag. Another technique involves polling the STATUS CODE 350 field of user profile database 330. Different values stored within STATUS CODE 350 field correspond to different status conditions. For example, status code N may indicate that no email is present in the user's account, status code W may indicate that new mail is present in the user's account, status code U may indicate that unread email (email of which the user is aware, but has not yet accessed) is present in the user's account. Of course, different status code schemes could be implemented, such as 1 for new mail and 0 for no new mail. Advanced schemes may contain information pertaining to the sender or subject of the email, for example. The status notification flags are preferably updated whenever new email is received, or whenever the user accesses the account or receives a notification message pertaining to the account. The example method in FIG. 4 assumes that there are only two possibilities. Either email is waiting in the user's account, or email is not waiting in the user's account.

If it is determined that email is not waiting in the user's account, then the RAS allows the incoming call to remain in an on-hook status, as is shown by step 354. By not going into an off-hook state, no PSTN tolls are incurred by either the RAS or the calling party. The call will continue to ring until the call is terminated by the user, as shown by step 356. The termination may occur by the user hanging up the telephone after a predetermined amount of time or after a predetermined number of rings, or it may occur by programming the dialing computer to terminate the call after a predetermined amount of time or after a predetermined number of rings. Self-terminating software is known by those skilled in the art.

Alternatively, the RAS may perform a quick hang up operation at step 354, in which case the RAS briefly goes into an off-hook state before going into the on-hook state again. This second alternative may be more efficient where tolls are accessed on a ring-time basis rather than a per-call basis. A quick hang up may also be useful where the calling number is not recognized, in order to minimize the time that the line is tied up by the unknown caller. Additionally, an error message could be transmitted to the unknown caller as part of the quick hang up operation.

If it is determined that email is waiting in the user's account at step 352, then the RAS goes into an off-hook state, as shown by step 358. The steps taken upon going to the off-hook state may vary depending on the calling device, the preferences of the user and/or ISP, and security considerations. In the present example, the email waiting in the user's account is retrieved and sent across the communication connection between the RAS and the user's computer, as shown by step 360. For security reasons, an authentication procedure may be executed before step 360. After waiting email is sent to the user, the call is terminated, as shown by step 362. The call may be terminated by either the RAS or the user's computer going back into the on-hook state, for example.

FIG. 6 is a flow diagram illustrating a second implementation of a toll saving method 400 according to the present invention. Steps 402, 404, 406, 408, 452, 454, 456, and 462 reflect steps 302, 304, 306, 308, 352, 354, 356, and 362 in FIG. 4, and reference may be made to the description accompanying FIG. 4 for a detailed description of these steps. A notable difference in method 400, is the steps taken upon a determination that email (or other similar information) is waiting the user's account, as determined by step 452.

If it is determined that email is waiting in the user's account, then the ISP notifies the user of the waiting email, as shown in step 458.

In the preferred embodiment, the RAS goes into an off-hook state, and notification is provided to the user by using the connection between the user or user's computer and the RAS. It may be useful to have fields in the user profile database 330 (or some other location) that specify the type of device associated with the calling phone number. If the calling phone number is determined to be from a voice telephone, then an automated voice notification message can be transmitted. Similarly, as in method 300, the email or other updateable information itself could be sent as an audible signal. Software that converts data to speech is known by those having skill in the art. If the calling number is determined to be from a computer, then a data notification message can be transmitted, causing a notification flag to be set in the user's computer. Such a flag may be a software based flag, such as a message that appears on the monitor of the user's computer, or it may be a flashing light on the user's computer or modem, for example. Similarly, if the calling number is determined to be from a simple junction box that has a functionality to place calls to the RAS periodically, a tone-based message indicating the number of waiting email messages can be transmitted by the RAS, whereupon the junction box will decode the message and display the number of waiting emails to the user. The notification techniques described above, in which the RAS notifies the user of waiting information, are not limited to the examples set forth above, and other similar notification techniques are contemplated as being within the realm of the present invention.

It may be advantageous for the ISP to have more than one dial-in number. One number could be used for the toll saving notification and retrieval method in accordance with the present invention, while the other number could be used when the user wishes to dial in to establish a SLIP or PPP connection to access the World Wide Web, for example. This may desirable where a dial-in number is only used for toll saving notification and retrieval, and no login functionality is provided for the user to access the user's account for other purposes.

Although the above examples describe preferred embodiments that use email and an RAS, no limitations are implied, in number or in kind. Other types of information can also be used with the preferred embodiment, and other communication devices may be used as well.

A software implementation of a preferred embodiment is described with reference to FIGS. 7–10. The software implementation includes three sets of machine language instructions, with an optional fourth set of instructions.

Figure 7:
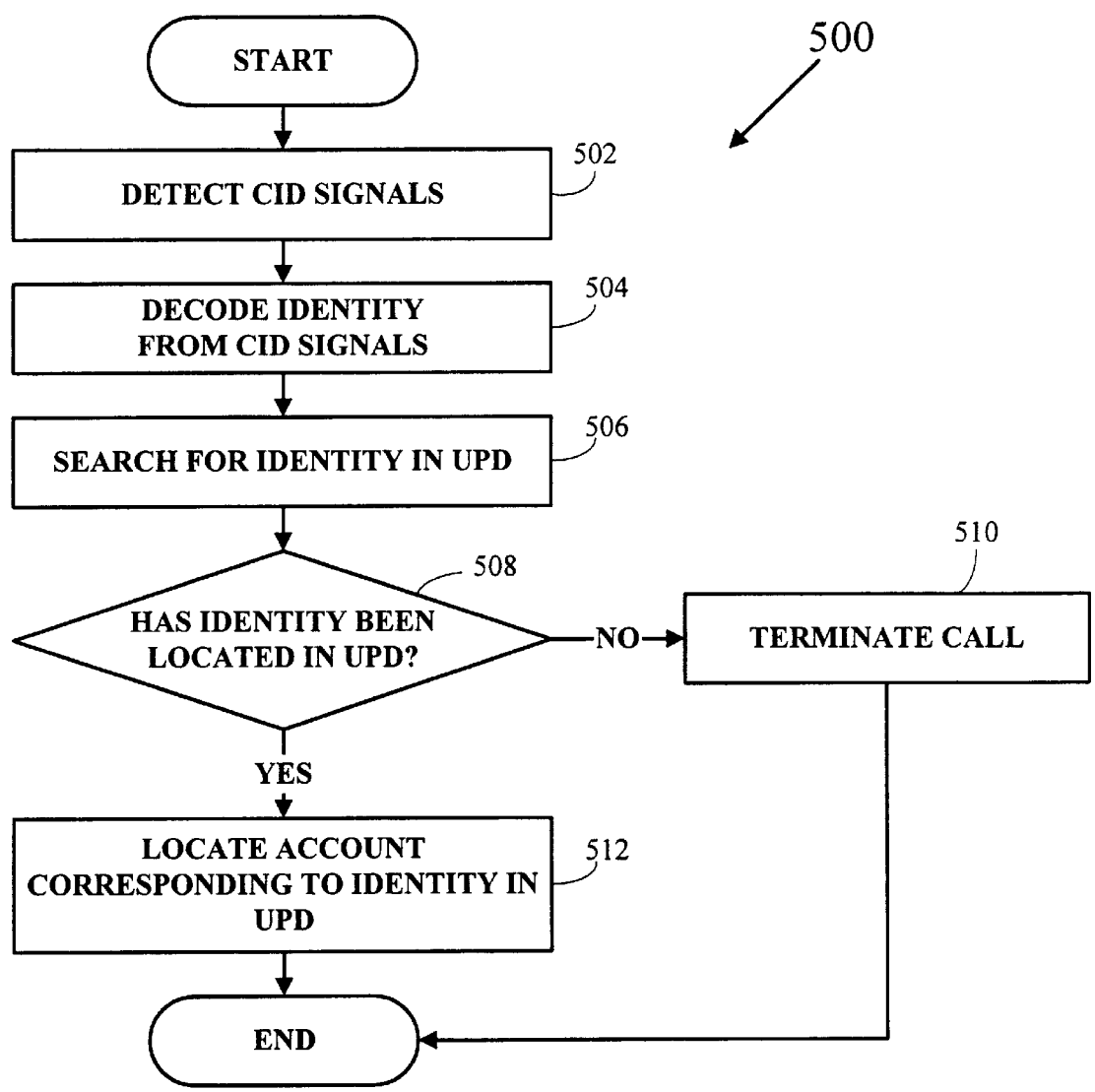
FIG. 7 is a flow diagram illustrating an implementation of a first set of machine language instructions according to the preferred embodiment.

FIG. 7 is a flow diagram illustrating an implementation 500 of a first set of machine language instructions according to the preferred embodiment. The first set of machine language instructions are stored in memory and are executed by a processor to cause a communication device receiving an incoming call to identify an account from caller identification (CID) information, while the communication device is in an on-hook state. First, CID signals are detected, as shown in step 502. Next, the CID signals are decoded using known decoding algorithms to obtain an identity for the incoming call, as shown in step 504. The identity may be the name of the caller, the phone number of the caller, the address of the caller, a machine address of the caller, or some other feature that identifies the caller, for example.

After an identity has been decoded, an account is determined for the identity. The account contains information that is accessible by the account holder. In the preferred embodiment, an account is determined for the identity by searching the user profile database (UPD) for the identity, as shown by step 506. A determination is made as to whether the identity exists in the UPD, as shown by step 508.

If the identity cannot be located in the UPD, then it is assumed that the identity does not have an account, and the call is terminated, as shown by step 510. Alternatively, if the identity cannot be located in the UPD, the communication device receiving the incoming call may perform some other action, such as switching to an off-hook state to transmit an error message and switching back to the on-hook state to terminate the call, for example.

If the identity is located in the UPD, then the account corresponding to the caller identity is determined, as shown in step 512. This may be performed by polling the USER ID field corresponding to the caller identity in the UPD, for example. Of course, the method of determining the account from the identity will vary depending on how user information is stored and accessed by the communication device.

Figure 8A:
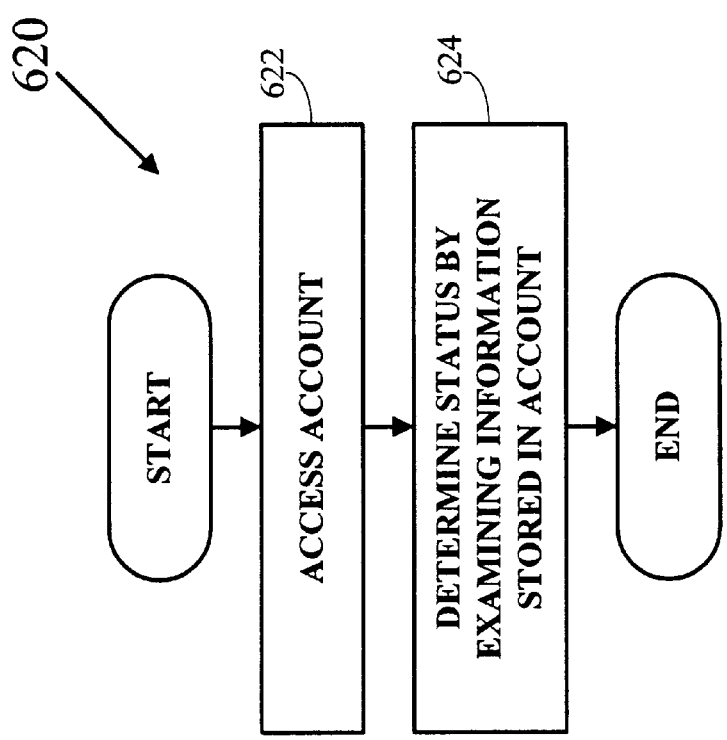
FIG. 8A is a flow diagram illustrating a first implementation of a second set of machine language instructions according to the preferred embodiment.
Figure 8B:
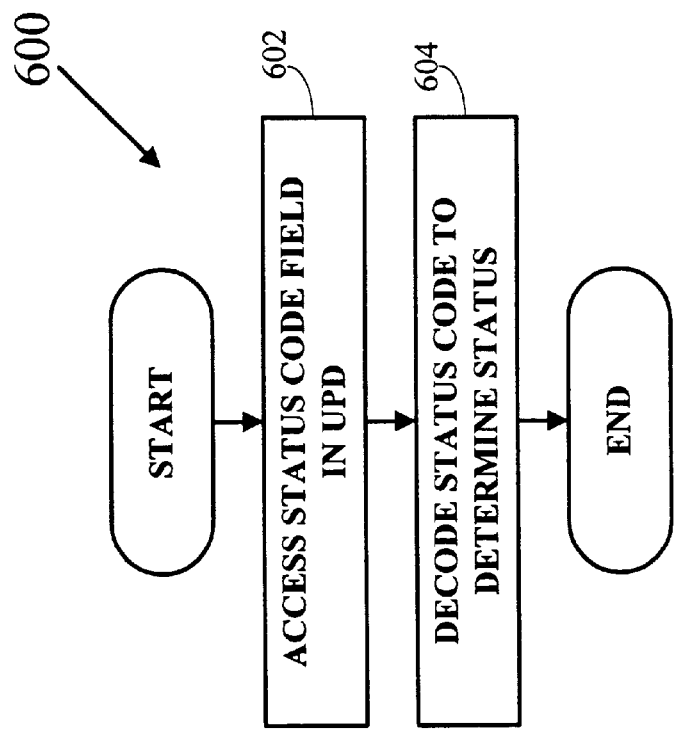
FIG. 8B is a flow diagram illustrating a second implementation of a second set of machine language instructions according to the preferred embodiment.

FIGS. 8A and 8B are flow diagrams illustrating two implementations of a second set of machine language instructions according to the preferred embodiment. The second set of machine language instructions are stored in memory and are executed by a processor to cause a communication device receiving an incoming call to determine an event status for the account identified from the CID signals, while the communication device is in an on-hook state.

FIG. 8A is a flow diagram illustrating a first implementation 600 of a second set of machine language instructions according to the preferred embodiment. The first implementation 600 makes use of the UPD to determine event status. First, a status code field in the UPD is accessed, as shown by step 602. Next, the status code is decoded to determine the current event status, as shown in step 604. As shown in the exemplary UPD in FIG. 5, each USER ID field entry has a corresponding STATUS CODE field entry associated with it. The possible STATUS CODE field values are configurable to represent various predetermined event status conditions. The actual entries may be updated on a periodic schedule, or they may be updated whenever the event status changes, for example. In a preferred embodiment, the event status represents whether unaccessed information is present in the account.

FIG. 8B is a flow diagram illustrating a second implementation 620 of a second set of machine language instructions according to the preferred embodiment. The second implementation 620 does not make use of the UPD to determine event status. First, the communication device receiving the call accesses the account identified from the CID signals, as shown in step 622. Next, the information in the account is examined to determine an event status, as shown in step 624. For example, if the account was last accessed on Jan. 4, 1999 at 10:26:23 am, the event status may correspond to whether information has been stored in the account subsequent to that date and time. In a preferred embodiment, time stamps are placed on new account information and are used to determine when information is received. Different methods may be used to determine an event status for the account, the example described above is not limiting.

Figure 9:
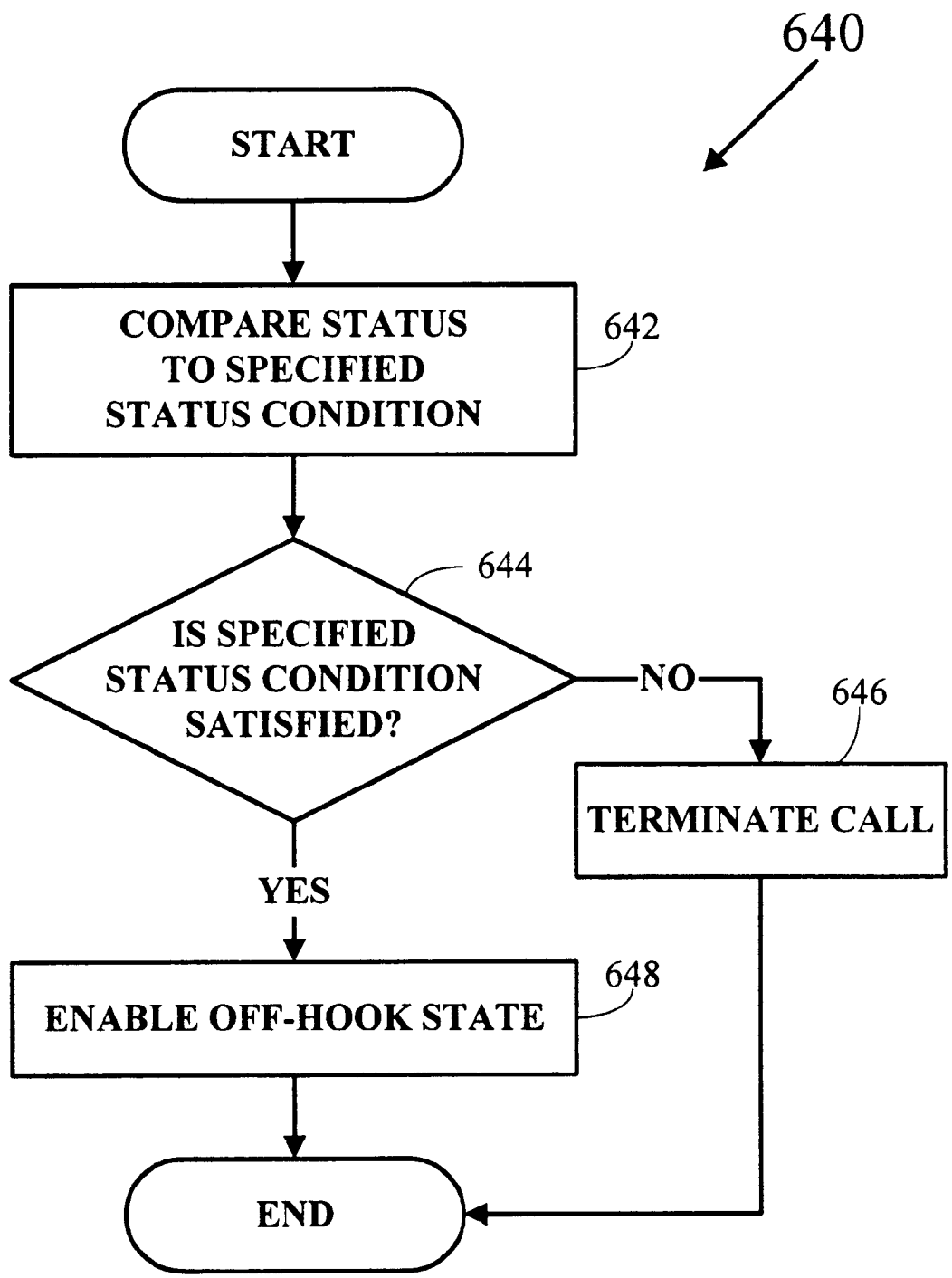
FIG. 9 is a flow diagram illustrating a third set of machine language instructions according to the preferred embodiment.

FIG. 9 is a flow diagram illustrating an implementation 640 of a third set of machine language instructions according to the preferred embodiment. The third set of machine language instructions are stored in memory and are executed by a processor to cause a communication device receiving the incoming call to control whether the communication device goes into an off-hook state, based upon the event status of information contained in the account. First, the account status, as determined in the second set of machine language instructions, is compared to a specified status condition, as shown in step 642. For example, a user profile database (UPD) may contain a field that stores specified status conditions, such as the SPECIFIED CONDITION field in the UPD shown in FIG. 5. For the account being queried, the value in the SPECIFIED CONDITION field is compared to the value in the STATUS CODE field.

It is then determined whether the specified status condition has been satisfied, shown in step 644. In the preferred embodiment, the specified status condition is satisfied when the account status value equals the specified status condition value. For example, using the UPD shown in FIG. 5, for GUIDO SCHUSTER 332, the account status code is N, and the specified status condition is N, therefore the specified status condition has been satisfied. In an alternative embodiment, the specified status condition is satisfied when the account status value does not equal the specified status condition value.

If the specified status condition is not satisfied, then the call is terminated, as shown in step 646, and the communication device receiving the incoming call never goes into an off-hook state.

If the specified status condition is satisfied, the communication device receiving the incoming call goes into an off-hook state, as shown by step 648. The receiving communications device can then notify the calling communication device of the account status, or it can perform some other notification function. Alternatively, the information in the account may be transmitted to the calling device.

FIG. 10 is a flow diagram illustrating an implementation 700 of a fourth set of machine language instructions according to the preferred embodiment. The fourth set of machine language instructions are stored in memory and are executed by a processor to cause the communication device receiving the incoming call (the receiving communication device) to transmit the information stored in the account to be transmitted to the device that placed the incoming call (the calling communication device). In a preferred embodiment, the information to be transmitted is only that information that is referenced by the account status code, such as unaccessed email. The implementation 700 of a fourth set of machine language instructions begins with the receiving communication device accessing the account to retrieve the information stored in the account, which may only be a portion of the total information stored in the account, as shown in step 702. Next, the retrieved information is prepared for transmission to the calling communication device, as shown in step 704. The preparations for transmission will depend on how the information is transmitted. For example, the information may be broken into packets and given error checking and correction capabilities. Alternatively, the information may be coded for security purposes. Other preparations may also be performed. After the information has been prepared for transmission, the information is transmitted to the calling device, as shown by step 706. Finally, the call is terminated, as shown in step 708. The call may be terminated by the communication device that received the incoming call upon completion of the information transmission, or the call may be terminated by the calling device upon receipt of the transmitted information, for example. The call may be terminated by either communication device going back into an on-hook state.

An operating environment for communication devices of the present invention may include a processing system with at least one high speed Central Processing Unit ("CPU") and a memory. In accordance with the practices of persons skilled in the art of computer programming, the present invention is described above with reference to acts and symbolic representations of operations that are performed by the processing system, unless indicated otherwise. Such acts and operations are referred to as being "computer-executed" or "CPU executed."

It will be appreciated that acts and symbolically represented operations include the manipulation of electrical signals by the CPU. The electrical system represents data bits which cause a resulting transformation or reduction of the electrical signal representation, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic disks and any other volatile (e.g., Random Access Memory ("RAM")) or non-volatile (e.g., Read-Only Memory ("ROM")) mass storage system readable by the CPU.

Preferred and alternative embodiments of the present invention have been illustrated and described. It will be understood, however, that changes and modifications may be made to the invention without deviating from its true spirit and scope, as defined by the following claims.

We claim:

1. A computer readable medium having stored therein instructions for causing a processing unit to execute a method for administering a remote access system, the method comprising the following steps:

receiving a connection request on a first communication device from a second communication device;

decoding identification information from the connection request to determine a user identity;

determining whether an event associated with the user identity has occurred; and upon determining that the event associated with the user identity has not occurred, not completing the connection request.

2. The computer readable medium of claim 1, wherein the method further comprises the following steps:

completing the connection request upon determining that the event associated with the user identity has occurred; and sending a notification signal to the second communication device.

3. The computer readable medium of claim 1, wherein the connection request is an incoming telephone call.

4. The computer readable medium of claim 1, wherein the first communication device is a remote access server.

5. The computer readable medium of claim 1, wherein the second communication device is a modem.

6. The computer readable medium of claim 1, wherein the event associated with the user identity is a presence of email associated with the user identity.

7. The computer readable medium of claim 1, wherein the event associated with the user identity is a presence of voice mail associated with the user identity.

8. The computer readable medium of claim 1, wherein the event associated with the user identity is an occurrence of a financial condition.

9. The computer readable medium of claim 1, wherein the event associated with the user identity is an occurrence of a weather condition.

10. The computer readable medium of claim 1, wherein the event associate with the user identity is an occurrence of a sports score condition.

11. The computer readable medium of claim 1, wherein the event associated with the user identity is an occurrence of a traffic condition.

12. A method for determining an event status comprising the following steps:

receiving a call at a communication device while causing the communication device to remain in an on-hook state, wherein the call is initiated by a telephony device;

detecting a caller identification signal after a first ring occurs;

decoding the caller identification signal to determine a user account; and determining whether an event associated with the user account has occurred, and causing the communication device to go into an off-hook state upon determining that an event associated with the user account has occurred.

13. A computer readable medium having stored therein instructions for causing a processing unit to execute the method of claim 12.

14. The method of claim 12, further comprising the step of performing a quick hang up operation on determining that an event associated with the user account has not occurred.

15. The method of claim 12, further comprising the step of transmitting information stored in the user account to the telephony device upon determining that an event associated with the user account has not occurred.

16. A method of using caller identification information to determine an event status, comprising the following steps:

causing a telephony device to originate a call to a remote access server, the call containing caller identification information;

receiving the call from the telephony device at the remote access server, without answering the call;

decoding the caller identification information at the remote access server;

querying a user profile database to determine an event status; and allowing the call to go unanswered upon determining a specified event status.

17. The method of claim 16, wherein the telephony device is programmed to automatically originate calls according to a notification schedule.

18. An apparatus for providing access to a remote access system in response to a call from a telephony device, the apparatus having an on-hook state and an off-hook state, wherein voice or data transmission occurs while the apparatus is in the off-hook state, the apparatus comprising, in combination:

a first decoder for decoding caller identification signals while the apparatus is in the on-hook state to identify a user account corresponding to the incoming call;

a second decoder for determining whether unaccessed information is present in the user account; and a controller for switching the apparatus to the off-hook state in response to the second decoder determining that unaccessed information is present in the user account.

19. The apparatus of claim 18, further comprising:

a transmitter for transmitting the unaccessed information to the telephony device.

20. A remote access server for notifying a user about unaccessed information in an account, the remote access server comprising, in combination:

a computer processor;

a memory;

a first set of machine language instructions stored in the memory and executed by the processor for identifying the account from caller identification information while the remote access server is in an on-hook state; and a second set of machine language instructions stored in the memory and executed by the processor for determining whether unaccessed information is present in the account; and a third set of machine language instructions for controlling whether the remote access server goes into an off-hook state, based upon whether unaccessed information is present in the account.

21. The remote access server of claim 20, further comprising a fourth set of machine language instructions for transmitting the unaccessed information to the user.

22. A method for providing notification of received electronic mail, comprising, in combination:

receiving an incoming call across a telephone line, without answering the incoming call, wherein caller identification information is associated with the incoming call;

determining whether any electronic mail messages have been received for an account associated with the caller identification information, without answering the incoming call request; and answering the call only upon determining that at least one electronic mail message has been received for the account associated with the caller identification information.

23. The method of claim 22, further comprising transmitting across the telephone line a notification of a quantity of electronic mail messages received.

24. The method of claim 22, further comprising transmitting across the telephone line the at least one electronic mail message.

25. A method for providing notification of received voice messages, comprising, in combination:

receiving an incoming call across a telephone line, without answering the incoming call, wherein caller identification information is associated with the incoming call;

determining whether any voice messages have been received for an account associated with the caller identification information, without answering the incoming call request; and answering the call only upon determining that at least one voice message has been received for the account associated with the caller identification information.

26. The method of claim 25, further comprising transmitting across the telephone line a notification of a quantity of voice messages received.

27. The method of claim 25, further comprising transmitting across the telephone line the at least one voice message.

28. A method for providing event notification, comprising, in combination:

receiving an incoming call across a telephone line, without answering the incoming call, wherein caller identification information is associated with the incoming call;

determining whether an event has occurred, without answering the incoming call request, wherein the event is selected from the group consisting of an email condition, a voicemail condition, a pager condition, a video mail condition, a financial condition, a sports score condition, a news condition, and a traffic condition; and answering the call only upon determining that the event has occurred.

29. The method of claim 28, further comprising transmitting across the telephone line a notification of the event occurrence.

30. The method of claim 28, further comprising transmitting across the telephone line information associated with the event, wherein the information is selected from the group consisting of at least one email message, at least one voicemail message, at least one pager message, at least one stock quote, at least one stock alert, at least one sports score, at least one horoscope update, and at least one news alert.

31. A method for administering a remote access system, comprising in combination:

receiving a connection request on a first communication device from a second communication device;

decoding identification information from the connection request to determine a user identity;

determining whether an event associated with the user identity has occurred, wherein the event is selected from the group consisting of a presence of email associated with the user identity, a presence of voice mail associated with the user identity, an occurrence of a financial condition, an occurrence of a weather condition, an occurrence of a sports score condition, and an occurrence of a traffic condition; and upon determining that the event associated with the user identity has not occurred, not completing the connection request.

32. A toll saving method of notifying a user when an event has occurred, comprising in combination:

receiving at a communication device a connection request, while the communication device is in an on-hook state;

detecting a caller identification signal associated with the connection request, while the communication device is in the on-hook state;

decoding the caller identification signal to determine an identity of the user, while the communication device is in the on-hook state;

determining whether an event corresponding to the identity has occurred, while the communication device is in the on-hook state; and in response to a determination that the event corresponding to the identity has not occurred, not completing the connection request.

33. The method of claim 32, wherein the communication device is a remote access server.

34. The method of claim 32, wherein the connection request is originated by a telephony device.

35. The method of claim 32, wherein the connection request is originated by a telephone operated by a human.

36. The method of claim 34, wherein the telephony device is a modem.

37. A toll saving method of notifying a user when an event has occurred, comprising in combination:

receiving at a communication device a connection request, while the communication device is in an on-hook state;

detecting a caller identification signal associated with the connection request, while the communication device is in the on-hook state;

decoding the caller identification signal to determine an identity of the user, while the communication device is in the on-hook state;

determining whether an event corresponding to the identity has occurred, while the communication device is in the on-hook state; and causing the communication device to switch to an off-hook state in response to a determination that the event corresponding to the identity has occurred, thereby completing the connection request.

38. The method of claim 37, wherein the communication device is a remote access server.

39. The method of claim 37, wherein the connection request is originated by a telephony device.

40. The method of claim 37, wherein the connection request is originated by a telephone operated by a human.

41. The method of claim 39, wherein the telephony device is a modem.

* * * * *